US 8,036,217 B2

(12) United States Patent  (10) Patent No.: US 8,036,217 B2
Srinivasan  (45) Date of Patent: Oct. 11, 2011

(54) METHOD AND APPARATUS TO COUNT MAC MOVES AT LINE RATE

(75) Inventor: Shriram Srinivasan, Santa Clara, CA (US)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 521 days.

(21) Appl. No.: 12/132,579

(22) Filed: Jun. 3, 2008

(65) Prior Publication Data

US 2009/0296727 A1   Dec. 3, 2009

(51) Int. Cl.
 *H04L 12/28* (2006.01)
(52) U.S. Cl. ........ 370/389; 370/253; 370/216; 370/222; 370/402
(58) Field of Classification Search .................. 370/389, 370/395, 241
See application file for complete search history.

(56) References Cited

U.S. PATENT DOCUMENTS

| 2004/0218539 | A1 | 11/2004 | Anqud et al. | |
| 2005/0286430 | A1* | 12/2005 | Koga et al. | 370/241 |
| 2007/0118595 | A1* | 5/2007 | Jain et al. | 709/203 |
| 2008/0056278 | A1* | 3/2008 | Kadambi et al. | 370/395.53 |

OTHER PUBLICATIONS

"Gigabit Copper Smartcard GX-1420B" by Spirentcom hereafter referred as Spirentcom, 2001.*
"IEEE Standard for Local and Metropolitan Area Networks, Media Access Control (MAC) Bridges," IEEE Computer Society, IEEE Std 802.1 D-2004, Sponsored by the LAN/MAN Standards Committee, New York, NY, Jun. 9, 2004, 281 pages.

* cited by examiner

*Primary Examiner* — Dang Ton
*Assistant Examiner* — Pamit Kaur
(74) *Attorney, Agent, or Firm* — Blakely Sokoloff Taylor & Zafman, LLP

(57) ABSTRACT

A method and apparatus for counting Media Access Control (MAC) address moves at line rate is described. According to one embodiment of the invention, a line card in a network bridge receives a frame at a port having a source MAC address that is associated with a different port of the network bridge. The line card signals a control card of the network bridge that the source MAC address has moved. The control card processes the source MAC address move and increments a MAC address move counter. If the MAC address move counter exceeds a MAC address move count threshold for a given time interval, the control card signals each line card in the network bridge to count each frame they receive on any port having that source MAC address. Other methods and apparatuses are also described.

22 Claims, 5 Drawing Sheets

CHILD BRIDGE FORWARDING STRUCTURE 232A

| MAC ADDR 402 | PORT 404 | COUNT 406 | TIMESTAMP 408 |
|---|---|---|---|
| MAC1 | 112 | 2 | T2 |
| MAC2 | 114 | - | - |
| MAC3 | 112 | - | - |

FIG. 4

METHOD AND APPARATUS TO COUNT MAC MOVES AT LINE RATE

BACKGROUND

1. Field

Embodiments of the invention relate to the field of network processing; and more specifically, to counting Media Access Control (MAC) addresses moves.

2. Background

A layer 2 network bridge (data link layer in the Open Systems Interconnection Basic Reference Model (OSI MODEL), ISO/IEC 7498-1, Nov. 15, 1994) is a device used to connect multiple computing devices from one network to other network(s). The bridge scans incoming data frames for the source MAC address and the destination MAC address. A MAC address is typically a globally unique address of a physical network interface card inside a computing device and usually does not change for the life of the computing device.

A network bridge dynamically builds a forwarding structure based upon the source MAC addresses of the frames it receives and the ports associated with those MAC addresses. A typical architecture of a network bridge includes at least one control card and multiple line cards. The control card includes a parent bridge forwarding structure which stores a master version of the associations between MAC addresses and ports. The control card distributes the content of the parent bridge forwarding structure to each of the line cards (e.g., to child bridge forwarding structures). Thus, each line card typically has an equivalent child bridge forwarding structure that reflects the information in the parent bridge forwarding structure.

Upon receiving a frame, a processor on the line card performs a lookup in its child bridge forwarding structure to determine if the source MAC address is associated with the port the frame was received on. A source MAC address miss is determined if the source MAC address is not associated with the port the frame was received on. For example, a source MAC address miss exists if the MAC address is associated with a different port than the frame was received on, or if the MAC address is not associated with any ports. If the MAC address is associated with a different port than the frame was received on, the source MAC address has moved. This is referred to as a source MAC address move (e.g., the source MAC address has moved between ports). Source MAC address moves may occur for expected (legitimate) reasons (e.g., the computing device associated with that source MAC address has physically moved locations) and/or unexpected (illegitimate) reasons (e.g., a bridge forwarding loop). A bridge forwarding loop may cause many source MAC address misses in a short amount of time (e.g., at line rate). If there is a source MAC address miss (e.g., either the MAC has moved, or the MAC is unknown) the line card sends a source MAC address miss message to the central processing unit (CPU) of the control card. The CPU updates the parent bridge forwarding structure and distributes the update to each of the line cards, and increments a source MAC address move counter (in case the source MAC has moved to a different port). Depending on the load on the CPU, this process may take several seconds.

Applications exist that attempt to prevent bridge forwarding loops. For example, the Spanning Tree Protocol (STP) (described in Institute of Electrical and Electronics Engineers (IEEE) standard 802.1D, Jun. 9, 2004) is a commonly used scheme to prevent network loops. A STP application, when performed correctly, may prevent a bridge forwarding loop by blocking one or more ports. However, in some circumstances, a STP application or other network loop prevention applications are unable to prevent a bridge forwarding loop. For example, STP must be configured at each of the ports of the network in the bridge to prevent bridge forwarding loops. On some occasions, a network administrator may incorrectly configure STP which may lead to STP not being configured on each of the ports. As another example, other types of bugs (hardware or software), and/or other configuration errors, cause the loop prevention application to fail (i.e., to not detect the loop).

As an additional safeguard to the loop prevention applications, many network bridges also perform a source MAC address move detection application. Typically, the source MAC address move detection applications blocks ports in a similar fashion as a STP application to resolve a bridge forwarding loop. Since not all source MAC address moves are for unexpected reasons, the source MAC address move detection algorithm is not performed until a certain threshold of source MAC address moves are met over a given time interval (e.g., five source address MAC moves in a period of time of 5 seconds). Typically a CPU in the control card of the network bridge counts the source address MAC moves and determines whether to execute the MAC address move detection application.

BRIEF DESCRIPTION OF THE DRAWINGS

The invention may best be understood by referring to the following description and accompanying drawings that are used to illustrate embodiments of the invention. In the drawings:

FIG. 4 is an exemplary child bridge forwarding structure according to one embodiment of the invention.

DETAILED DESCRIPTION

Figure 1:
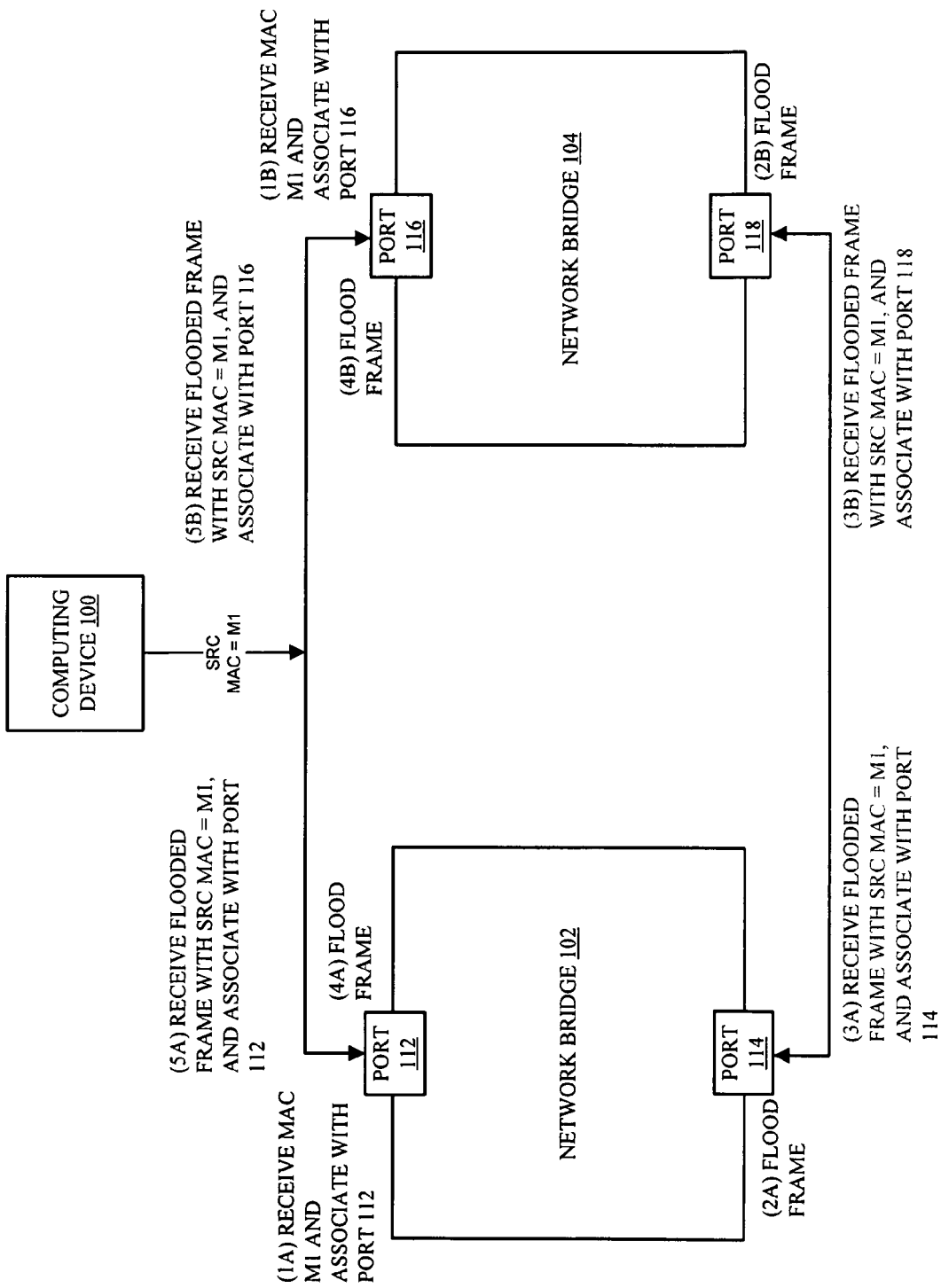
FIG. 1 is a data flow diagram illustrating an exemplary network bridge forwarding loop according to one embodiment of the invention.

In the following description, numerous specific details are set forth. However, it is understood that embodiments of the invention may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

In the following description and claims, the terms "coupled" and "connected," along with their derivatives, may be used. It should be understood that these terms are not intended as synonyms for each other. "Coupled" is used to indicate that two or more elements, which may or may not be in direct physical or electrical contact with each other, co-operate or interact with each other. "Connected" is used to indicate the establishment of communication between two or more elements that are coupled with each other.

The techniques shown in the figures can be implemented using code and data stored and executed on one or more electronic devices (e.g., a computer, a network element, etc.). Such electronic devices store and communicate (internally and with other electronic devices over a network) code and data using machine-readable media, such as machine storage media (e.g., magnetic disks; optical disks; random access memory; read only memory; flash memory devices) and machine communication media (e.g., electrical, optical, acoustical or other form of propagated signals—such as carrier waves, infrared signals, digital signals, etc.). In addition, such electronic devices typically include a set of one or more processors coupled to one or more other components, such as a storage device, one or more user input/output devices (e.g., a keyboard and/or a display), and a network connection. The coupling of the set of processors and other components is typically through one or more busses and bridges (also termed as bus controllers). The storage device and signals carrying the network traffic respectively represent one or more machine storage media and machine communication media. Thus, the storage device of a given electronic device typically stores code and/or data for execution on the set of one or more processors of that electronic device. Of course, one or more parts of an embodiment of the invention may be implemented using different combinations of software, firmware, and/or hardware.

As used herein, a network element (e.g., a router, switch, bridge, etc.) is a piece of networking equipment, including hardware and software that communicatively interconnects other equipment on the network (e.g., other network elements, computer end stations, etc.). Some network elements support the configuration of multiple contexts. As used herein, each context includes one or more instances of a virtual network element (e.g., a virtual bridge, a virtual router, etc.). Each context typically shares one or more computing resources (e.g., memory, processing cycles, etc.) with other contexts configured on the network element, yet is independently administrable. For example, in the case of multiple virtual bridges, each of the virtual bridges shares computing resources, but is separate from those other virtual routers regarding its management domain, authentication, authorization, and accounting (AAA) name space, and bridge forwarding data structure(s). As used herein, line rate is the rate at which a network element can forward traffic in a particular physical link at a given time. In addition, a maximum line rate is the maximum rate at which traffic can be forwarded by a physical entity in a network element.

A method and apparatus for counting source MAC address moves at line rate is described. In one embodiment of the invention, a line card in a network bridge receives a frame at a port having a source MAC address that is associated with a different port. The line card signals a CPU in a control card of the network bridge that the source MAC address has moved. The CPU processes the source MAC address move and increments a MAC address move counter. If the MAC address move counter exceeds a MAC address move count threshold for a given time interval, the CPU signals each line card in the network bridge to count each frame they receive on any port having that source MAC address.

FIG. 1 is a data flow diagram illustrating an exemplary network bridge loop where source MAC address moves are occurring at a fast rate according to one embodiment of the invention. FIG. 1 includes a computing device 100 (e.g., a desktop, laptop, server, workstation, etc.) communicatively coupled with a network bridge 102 and a network bridge 104. According to one embodiment of the invention, the computing device 100 transmits frames with a source MAC address of M1 (e.g., the frame is a broadcast frame). At operations 1A and 1B, the network bridges 102 and 104 respectively receive the frame with a source MAC address of M1 and associate that MAC address with the port it received the frame on (port 112 and port 116 respectively). Thus, the bridge forwarding structure on the network bridges 102 and 104 did not include an entry for MAC address M1 (the MAC address was unknown). In addition, the destination MAC address of the frame (not shown in FIG. 1 for simplicity purposes) is also not known. Thus, the network bridges 102 and 104 each flood the frame on each port except the port from which it came from. Thus, at operations 2A and 2B, the network bridges 102 and 104 flood the frame out ports 114 and 118 respectively.

At operations 3A and 3B, the network bridges 102 and 104 each receive the frame flooded by the other network bridge (the frame still has a source MAC address of M1). Thus, the network bridges 102 and 104 each believe that the source MAC address has moved (e.g., moved from ports 112 and 116 to ports 114 and 118 respectively). Thus, the network bridges 102 and 104 associate the source MAC address M1 with the ports 114 and 118. In addition, the destination of the MAC address is still unknown, thus, the network bridges flood the frame on each port except the port the frame was received on. Thus, at operations 4A and 4B, the network bridges 102 and 104 flood the frame out ports 112 and 116 respectively.

At operations 5A and 5B, the network bridges 102 and 104 each receive the frame flooded by the other network bridge and the frame still has a source MAC address of M1. Thus, the network bridges 102 and 104 each believe that the source MAC address has moved (e.g., moved from ports 114 and 118 to ports 112 and 116 respectively). Thus, the network bridges 102 and 104 associate the source MAC address M1 with the ports 112 and 116.

Thus, it should be understood that a bridge forwarding loop exists in FIG. 1. The bridge forwarding loop, which may continue indefinitely unless resolved, causes unnecessary use of network resources (e.g., bandwidth, processing cycles, memory, etc.) and traffic may become blackholed (silently dropped or discarded). Commonly, a loop detection application, such as a spanning tree protocol (STP) application, is employed in a bridge network similar to FIG. 1. STP, when performed correctly, blocks one or more ports which may prevent the loop. However, in certain circumstances, the loop detection algorithm fails to detect a loop. For example, STP must be configured at each of the ports of the network in the bridge to prevent loops (e.g., ports 112-118 in FIG. 1). On some occasions, a network administrator may incorrectly configure STP which may lead to STP not being configured on each of the ports. As another example, other types of bugs (hardware or software) and other configuration errors causes the loop detection algorithm to fail (i.e., to not detect the loop).

As an additional safeguard to the loop detection algorithm, typical network bridges also perform a source MAC address move detection application. As described previously, a source MAC address may move for expected and legitimate reasons (e.g., the computing device 100 may move physical locations which may cause traffic to be received on a different port) and for unexpected (illegitimate) reasons (e.g., during a bridge forwarding loop). Typically, the source MAC address move detection algorithms blocks ports in a similar fashion as a STP algorithm to resolve a bridge forwarding loop. Since not all source MAC address moves are for unexpected reasons, the source MAC address move detection algorithm is not performed until a certain threshold of source MAC address moves are met over a given time interval (e.g., five source address MAC moves in a period of time of 5 seconds).

Typical network bridges, which count all source MAC address moves in a CPU of the control card, which will not give an accurate count of the source MAC address moves. For example, upon a port at a first line card receiving a frame with a source MAC address of M1, which has moved (e.g., the source MAC address M1 is associated with a different port on a second line card), the first line card sends a source MAC miss message to the CPU (e.g., so that the CPU can process the message and update the parent bridge forwarding structure). After the CPU has processed the source MAC miss message and updated the parent bridge forwarding structure, the CPU downloads the update to the child bridge forwarding structures on the line cards (e.g., to change the association of the MAC address M1 to the new port on the first line card). Depending on the processing load of the CPU, this may take several seconds. Until the download is complete, (e.g., the child bridge forwarding structures are updated), the second line card will not have knowledge that the source MAC address M1 has moved ports. Thus, in the meantime, if the second line card receives frames with the source MAC address M1, it will not have knowledge that this is a source MAC address move (and will not send a source MAC miss message to the CPU). Thus, this source MAC address move will not be counted by the CPU. In the case of a bridge forwarding loop (e.g., as illustrated in FIG. 1), the second line card (and the first line card) will receive frames with the source MAC address M1 in a rapid fashion (e.g., at line rate). Thus, many source MAC address moves may not be counted by the CPU.

Applications which depend on source MAC address move counts (e.g., source MAC address move detection algorithms, statistical applications, network health applications) may be affected because of the inaccurate count. For example, execution of applications that depend on a source MAC address move count (e.g., a MAC address move detection application) may be delayed because of the inaccurate count. Thus, because of the inaccurate count, the network bridge may take longer to take corrective action during a bridge forwarding loop. It should be understood that the longer it takes for the network bridge to take corrective action during a bridge forwarding loop, the longer traffic may be sent to an incorrect bridge, the more network resources are unnecessarily consumed (e.g., processing cycles, memory, bandwidth, etc.), and the possibility that traffic becomes blackholed become greater.

Figure 2:
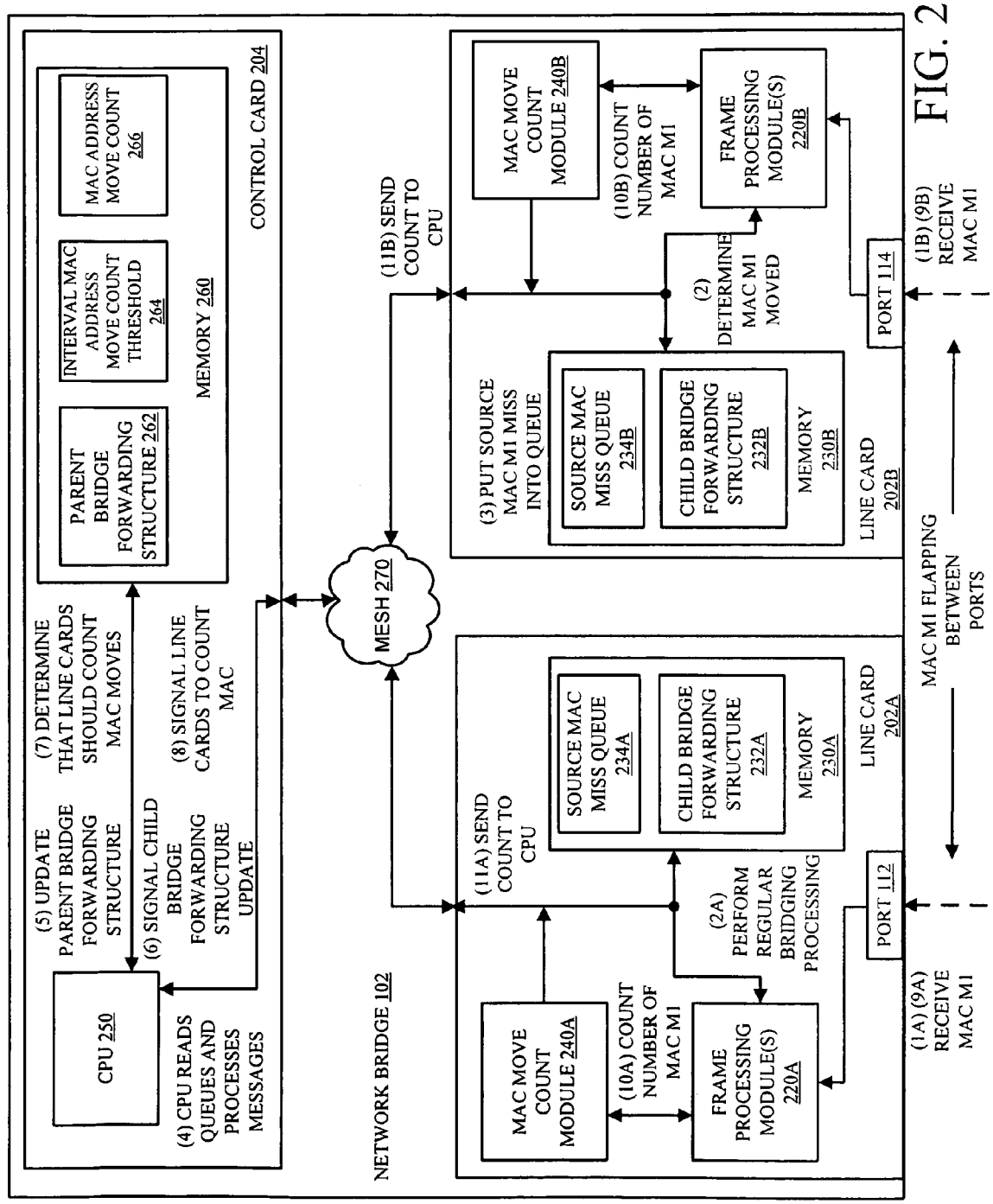
FIG. 2 is a data flow diagram illustrating an exemplary network bridge counting source MAC address moves at line rate according to one embodiment of the invention.

FIG. 2 is a data flow diagram illustrating an exemplary network bridge 102 counting source MAC address moves at line rate according to one embodiment of the invention. The architecture of the network bridge 102 illustrated in FIG. 2 is an example of an architecture of a network bridge, and other, alternative architectures may be used with the embodiments of the invention described herein. For example, other network bridges incorporating embodiments of the invention could have a single card incorporating the functionality of both control card(s) and line card(s).

The network bridge 102 includes the control card 204 and the line cards 202A and 202B. The control card 204 is communicatively coupled to each of the line cards 202A-B through the mesh 270. The control card 204 includes the CPU 250, and the memory 260. The memory 260 may take a variety of forms for differing embodiments of the invention including non-volatile memory (e.g., hard disk, optical disk, flash, phase change memory (PCM), etc.) and volatile memory (e.g., DRAM, SRAM, etc.). The memory 260 is to store the parent bridge forwarding structure 262, the interval MAC address move count threshold 264, and the MAC address move count 266. The line cards 202A-202B include frame processing module(s) 220A-B, MAC move count module 240A-B, and memory 230A-B respectively. The frame processing module(s) 220-B each can take a variety of forms in different embodiments of the invention, including Application Specific Integrated Circuits (ASICs), Field-Programmable Gate Arrays (FPGAs), general purpose microprocessors (e.g., CPUs), etc.). The memories 230A-B may take a variety of forms for differing embodiments of the invention including non-volatile memory (e.g., hard disk, optical disk, flash, PCM etc.) and volatile memory (e.g., DRAM, SRAM, etc.). The memories 230A-B respectively are to store the source MAC miss queue 234A-B, and the child bridge forwarding structure 232A-B. The line card 202A also includes the port 112, and the line card 202B includes the port 114.

At operations 1A and 1B, the ports 112 and 114 on the line cards 202A and 202B each receive a frame having a source MAC address of M1 respectively. The source MAC address M1 is flapping between the ports 112 and 114 (i.e., moving rapidly between the ports 112 and 114). For example, a bridge forwarding loop may be causing the source MAC address M1 flapping. At operation 2A, the frame processing module(s) 220A determines that the source MAC address M1 is associated with the port 112, and performs regular bridging processing (the frame processing module(s) 220A are unaware of the bridge forwarding loop). At operation 2B, the frame processing module(s) 220B determine that the source MAC address M1 has moved. For example, the frame processing module(s) 220B looks up the source MAC address M1 in the child bridge forwarding structure 232B and determines that M1 is associated with the port 112. After determining that the source MAC address M1 has moved, at operation 3 the frame processing module(s) 220B put a source M1 miss message into the source MAC miss queue 234B.

At operation 4, the CPU 250 reads the source MAC miss queue 234 and processes the source MAC address M1 miss message. As part of the processing, the CPU 250 updates the parent bridge forwarding structure 262 at operation 5. For example, the CPU modifies the association of the MAC address M1 to the port 114, and increments the MAC address move count 266 for the MAC address M1. At operation 6, the CPU 250 transmits the update to the child bridge forwarding structures 232A and 232B. According to one embodiment of the invention, only the entry being updated is transmitted to the line cards.

At operation 7, the CPU 250 determines that the line cards should begin to count each frame they receive having a source MAC address of M1. For example, the CPU 250 compares the MAC address move count for the MAC address M1 with the interval MAC address move count threshold 264. If the MAC address move count for M1 meets the threshold, then the CPU 250 determines that the line cards should count each frame received having a source MAC address of M1. Thus, according to one embodiment of the invention, meeting the interval MAC address move count threshold 264 triggers the line cards to begin counting frames having a particular MAC address. The interval MAC address move count threshold 264 identifies a number of source MAC address moves over a given time period (e.g., 5 source MAC address moves of a particular MAC address in 5 seconds). The value of the interval MAC address move count threshold is chosen such that there would be typically no legitimate reason (e.g., no expected reason) for a source MAC address to move ports more than the threshold amount in a given interval. For example, typically there is no legitimate reason for a source MAC address to move between ports 5 times in 5 seconds. According to one embodiment of the invention, the interval MAC address move count threshold 264 is configured separately for each port of the network bridge 102 (e.g., the interval MAC address move count threshold 264 identifies a number of source MAC address moves over a given time period for a particular port). According to another embodiment of the invention, the interval MAC address move count threshold 264 is configured for the network bridge 102 as a whole (e.g., the interval MAC address move count threshold 264 identifies a number of source MAC address moves over a given time period across all ports in the network bridge 102). If the threshold is met, the CPU 250 assumes that each subsequent frame received with a source MAC address of M1 (regardless of which port the frame is received on) should be counted as a source MAC address move (at least for a given interval until the counting is stopped, which is described in greater detail later herein). According to one embodiment of the invention, the time value the CPU uses in determining the interval is based on the time the CPU processes the source MAC address miss messages, and not the time the source MAC miss messages are put into the queue, and not the time the frames are received on the line cards. At an operation 8, the CPU 250 signals each line card in the network bridge 102 to begin counting each frame it receives having a source MAC address of M1.

At operations 9A and 9B, the ports 112 and 114 each receive a frame having a source MAC address of M1 respectively. In addition to any regular processing, (e.g., determining whether to add a source MAC miss queue message in the source MAC miss queues 234A-B respectively), at operations 10A and 10B the MAC move count modules 240A and 240B respectively increments a source MAC address move count for the MAC address M1. According to one embodiment of the invention, the MAC move count module 240A and 240B is an application-specific integrated circuit (ASIC) that, among other things, increments a source MAC address move counter.

Since the MAC move count modules 240A and 240B may increment the count for each frame received having that source MAC address, the count is performed at line rate (e.g., as fast as frames can be forwarded by that line card with that source MAC address). Thus, unlike typical network bridges where source MAC address move counting is performed in a control card, source MAC address moves may be counted at line rate on each line card in the network bridge. Therefore, since source MAC address moves may be counted at line rate, the total count of source MAC address moves is more accurate than counting source MAC address moves at the control card. Thus, execution of applications that depend on a source MAC address move count (e.g., a MAC address move detection application) are also more accurate. For example, a MAC move detection application, which depends on a source MAC address move count to trigger execution, may be executed sooner than if source MAC address moves were counted solely in a control card. Thus, corrective action during a bridge forwarding loop may begin sooner as a result of counting source MAC address moves at line rate.

According to one embodiment of the invention, the child bridge forwarding structures 232A and 232B are extended to support a count for each MAC address. For example, FIG. 4 is an exemplary child bridge forwarding structure 232A according to one embodiment of the invention. The child bridge forwarding structure 232A includes a column for the MAC address 402, the port that the MAC address is associated with 404, the MAC move count 406, and a timestamp value 408. In an alternative embodiment of the invention, a separate data structure is used to store the MAC move count and timestamp value for the MAC addresses whose frames are being counted by the line cards.

Periodically, the MAC move counts computed by the line cards are transmitted to the CPU 250. For example, the CPU 250 may request the line cards to transmit their MAC move count and/or the line cards may transmit their MAC move count to the CPU 250 when the count reaches a certain value. Thus, at operations 10A and 10B, the number of frames received having a source MAC address of M1 (i.e., the MAC move count) are transmitted to the CPU. The CPU receives the count and performs any further processing with that information. For example, the CPU may store the count in the MAC address move count 266. According to one embodiment of the invention, the MAC address move count 266 is a count per circuit or port. According to another embodiment of the invention, the MAC address move count 266 is a count per network bridge. The stored count may be used for statistical applications and/or for network health applications. Additionally, the CPU may use the count to determine whether to begin execution of a MAC move detection algorithm.

Figure 3A:
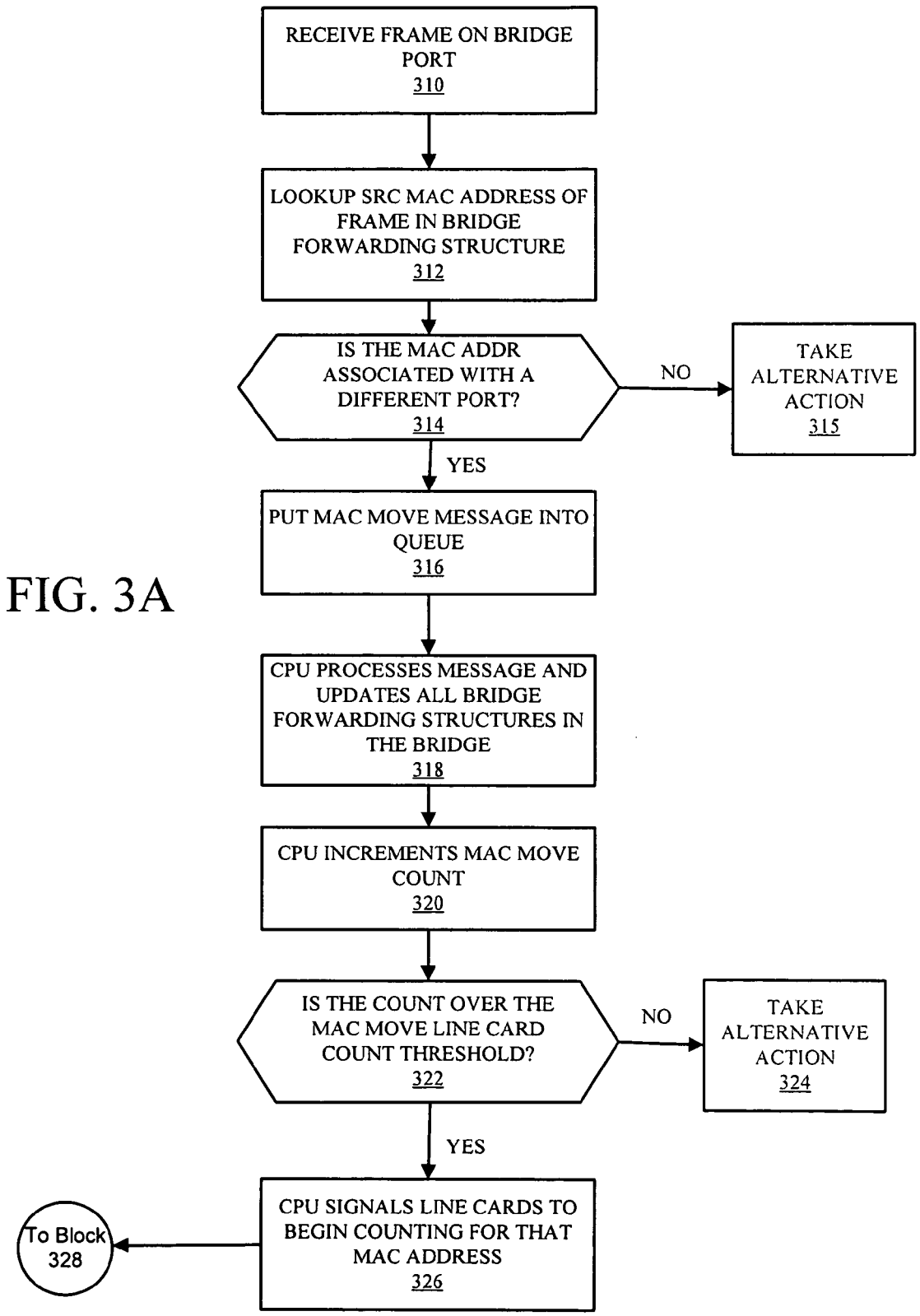
FIGS. 3A-3B are flow diagrams illustrating counting source MAC address moves at line rate according to one embodiment of the invention.
Figure 3B:
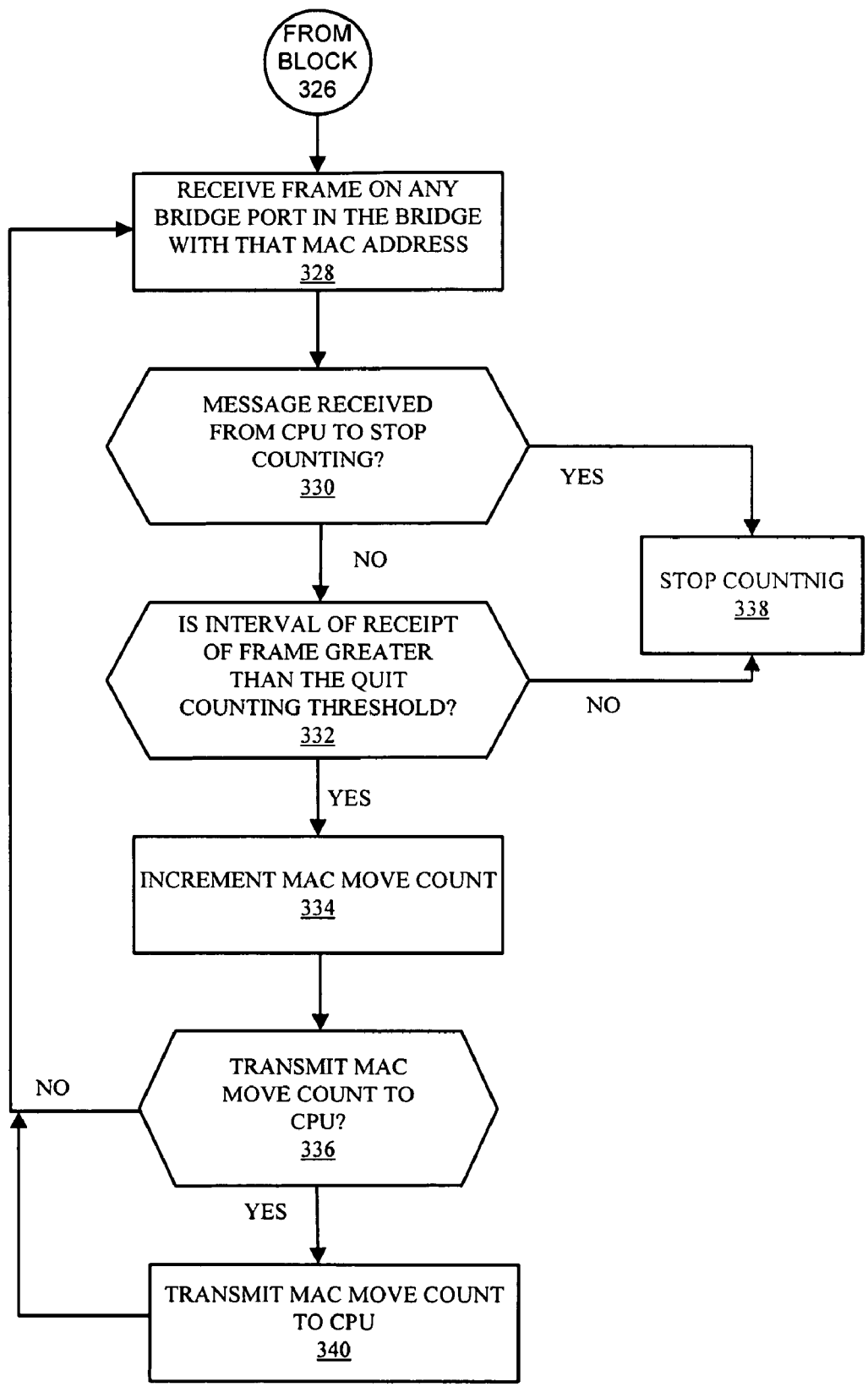

FIGS. 3A and 3B are flow diagrams illustrating counting source MAC address moves at line rate according to one embodiment of the invention. At block 310, a frame is received on a bridge port in a network bridge, and flow moves to block 312. At block 312, the source MAC address included in the frame is looked up in a bridge forwarding structure, and flow moves to block 314. At block 314, a determination is made whether the source MAC address is associated with a different port that it was received on. If the source MAC address is not associated with a different port (e.g., there is no entry in the bridge forwarding structure for that MAC address or the source MAC address is associated with the port the frame was received on), then flow moves to block 315 where alternative action is taken. If the source MAC address is associated with a different port (e.g., the source MAC address has moved ports), a source MAC address move message is placed into a MAC address move queue at block 316.

At block 318, the CPU reads the MAC address move queue and processes the source MAC address move message. As part of the processing, the CPU updates all bridge forwarding structures in the network bridge, and flow moves to block 320. At block 320, the CPU increments a MAC move count for the MAC address, and flow moves to block 322. At block 322, the CPU determines if the MAC move count meets the interval MAC address move count threshold. If the MAC move count does not meet the threshold, then flow moves to block 324 where alternative action is taken. If the MAC move count meets the threshold, then flow moves to block 326, where the CPU signals each line card in the network bridge to begin counting each frame received having that source MAC address, and flow moves to block 328.

At block 328, a frame having that MAC address is received at any bridge port on any line card in the network bridge, and flow moves to block 330. At block 330, the line card that received the frame determines if a message has been received from the CPU to stop counting frames with this MAC address. If the line card has received this message, flow moves to block 338 where the line card stops counting. If the line card has not received this message, flow moves to block 332.

At block 332, the line card determines if the interval of receipt of the frame at the bridge port is greater than a quit counting threshold. For example, in a bridge forwarding loop, the interval between two frames arriving at the same port having the same source MAC address should not be greater than a few seconds (e.g., the interval typically should not be greater than 5 seconds). In a typical bridge forwarding loop, the interval between two frames arriving at the same port having the same source MAC address is approximately 1/1000 of a second, or less, depending on the speed of the network bridge. According to one embodiment of the invention, each frame received is marked with a timestamp of receipt. An incoming frame is compared with the timestamp of the previously received frame. For example, the child bridge forwarding structure 232 includes a timestamp field 408. If the interval (e.g., current frame timestamp—previous frame timestamp) is higher than the quit counting threshold, then flow moves to block 338 where the line card stops counting for this MAC address. If the interval is not higher than the quit counting threshold, then flow moves to block 334 where the line card increments a MAC move count, and flow moves to block 336. At block 336, the line card determines whether to transit the MAC move count to the CPU. While in some embodiments of the invention the line card transmits the count to the CPU based on reaching a predetermined time, in alternative embodiments of the invention the line card transmits the count to the CPU based on different criteria (e.g., upon the MAC move count reaching a predefined number, upon the CPU requesting the MAC move count, etc.). If the line card determines to transmit the MAC move count to the CPU, flow moves to block 340 where the MAC move count is transmitted to the CPU, and flow moves back to block 328. If the line card determines not to transmit the MAC move count to the CPU, flow moves back to block 328.

Thus, unlike typical network bridges which count source MAC address moves in the CPU of the control card for a certain MAC address at less than line rate (thus likely not able to provide an accurate count in case of a bridge forwarding loop), in embodiments of the invention source MAC address moves are counted in the line cards of the network bridges at line rate (e.g., as fast as the network bridge can forward received frames having that MAC address). Thus, embodiments of the invention allow for a more accurate source MAC address move count since counting at line rate is more accurate than counting at less than line rate. Applications dependent on an accurate source MAC address move count (e.g., source MAC address move detection algorithms, statistical applications, network health applications, etc.) are thus able to perform more accurately and effectively.

According to some embodiments of the invention, the network bridge 102 is a virtual network bridge within a network element. For example, the network bridge 102 is a virtual network bridge of a bridge context, and may belong to a particular service provider (e.g., Internet Service Provider (ISP) A). The network bridge 104 may also be part of the bridge context, and may belong to the same service provider or a different service provider (e.g., ISP B). Each frame received may be assigned to a circuit, and the circuit may be bound to a particular virtual network bridge. A circuit can take a variety of forms in different embodiments of the invention, including a PPPoE session, ATM permanent virtual circuit (PVC), 802.1Q (VLAN) PVC, etc. In addition, in some embodiments of the invention, a source MAC address move includes a source MAC address moving between circuits and/or virtual network bridges.

While the data and flow diagrams in the figures show a particular order of operations performed by certain embodiments of the invention, it should be understood that such order is exemplary (e.g., alternative embodiments may perform the operations in a different order, combine certain operations, overlap certain operations, etc.)

While the invention has been described in terms of several embodiments, those skilled in the art will recognize that the invention is not limited to the embodiments described, can be practiced with modification and alteration within the spirit and scope of the appended claims. The description is thus to be regarded as illustrative instead of limiting.

What is claimed is:

1. A method for counting Media Access Control (MAC) address moves at line rate in a network bridge, comprising:
   receiving a frame at a first bridge port of a first one of a plurality of line cards of the network bridge, wherein the frame includes a source MAC address;
   determining that the source MAC address is associated with a second bridge port of the network bridge;
   signaling a control card that the MAC address has moved to the first bridge port;
   processing the MAC address move at the control card, wherein the processing includes incrementing a MAC address move count;
   responsive to determining that the MAC address move count has exceeded an interval MAC address move count threshold, signaling the plurality of line cards, by the control card, to count each frame they receive that includes that source MAC address; and
   each of the plurality of line cards counting each frame they subsequently receive that includes that source MAC address.

2. The method of claim 1, further comprising:
   each of the plurality of line cards determining to stop counting if an interval of frame receipt of frames including that source MAC address is greater than a predefined amount of time.

3. The method of claim 2, further comprising:
   each of the plurality of line cards stopping counting upon receiving a stop counting message from the control card.

4. The method of claim 1, further comprising each of the plurality of the line cards periodically sending a count of the number of frames they subsequently receive that includes that source MAC address to the control card.

5. The method of claim 4, further comprising adding the received value of counts to form a total number of MAC address moves, and comparing the total number of MAC address moves to a MAC address move detection application threshold, wherein if the total number of MAC address moves exceeds the MAC address move detection application threshold, performing the MAC address move detection application.

6. The method of claim 5, wherein the performing of the MAC address move detection application includes dropping those frames which include that source MAC address.

7. The method of claim 1, further comprising assuming that a network loop exists upon the determination that the MAC address move count has exceeded an interval MAC address move count threshold.

8. The method of claim 7, wherein the counting performed by each line card is at a rate equivalent to a receipt of frames rate.

9. A network bridge to count Media Access Control (MAC) address moves at line rate, comprising:
   a control card coupled with a plurality of line cards, the control card including,
      a processor to count source MAC address moves and determine if a number of source MAC address moves exceeds an interval MAC address move count threshold for a certain MAC address, and if that number is over the threshold, signal each of the plurality of line cards to count frames that are received that have that certain source MAC address, and a memory coupled with the processor, the memory to store the interval MAC address move count threshold; and the plurality of line cards, each of the plurality of line cards including, one or more bridge ports to receive frames, one or more frame processing modules coupled with the bridge ports and a MAC move count module, the frame processing modules to determine the source MAC address of each received frame, and the MAC move count module to count those frames that are received that have that certain source MAC address.

10. The network bridge of claim 9, wherein the processor is to assume that a network loop exists upon the determination that the number of source MAC address moves count has exceeded the interval MAC address move count threshold.

11. The network bridge of claim 9, wherein the MAC move count module of each of the line cards is further to stop counting frames if the processor signals a stop MAC move count message to the line cards.

12. The network bridge of claim 9, wherein the MAC move count module of each of the line cards is further to stop counting frames having that source MAC address if an interval of receipt of those frames is greater than a predefined value.

13. The network bridge of claim 9, wherein the MAC move count module of each of the line cards is further to transmit the count to the processor.

14. The network bridge of claim 13, wherein the processor further is to add the counts received from each of the MAC move count modules for that certain source MAC address and compare that number to a MAC address move detection application threshold, wherein if that number exceeds the MAC address move detection application threshold, the processor is to execute the MAC address move detection application.

15. A non-transitory machine-readable storage medium that provides instructions that, if executed by a processor, will cause said processor to perform operations for counting Media Access Control (MAC) address moves at line rate in a network bridge, comprising:

receiving a frame at a first bridge port of a first one of a plurality of line cards of the network bridge, wherein the frame includes a source MAC address;

determining that the source MAC address is associated with a second bridge port of the network bridge;

signaling a control card that the MAC address has moved to the first bridge port;

processing the MAC address move at the control card, wherein the processing includes incrementing a MAC address move count;

responsive to determining that the MAC address move count has exceeded an interval MAC address move count threshold, signaling the plurality of line cards, by the control card, to count each frame they receive that includes that source MAC address; and each of the plurality of line cards counting each frame they subsequently receive that includes that source MAC address.

16. The non-transitory machine-readable storage medium of claim 15, further comprising:

each of the plurality of line cards determining to stop counting if an interval of frame receipt of frames including that source MAC address is greater than a predefined amount of time.

17. The non-transitory machine-readable storage medium of claim 16, further comprising:

each of the plurality of line cards stopping counting upon receiving a stop counting message from the control card.

18. The non-transitory machine-readable storage medium of claim 15, further comprising each of the plurality of the line cards periodically sending a count of the number of frames they subsequently receive that includes that source MAC address to the control card.

19. The non-transitory machine-readable storage medium of claim 18, further comprising adding the received value of counts to form a total number of MAC address moves, and comparing the total number of MAC address moves to a MAC address move detection application threshold, wherein if the total number of MAC address moves exceeds the MAC address move detection application threshold, performing the MAC address move detection application.

20. The non-transitory machine-readable storage medium of claim 19, wherein the performing of the MAC address move detection application includes dropping those frames which include that source MAC address.

21. The non-transitory machine-readable storage medium of claim 15, further comprising assuming that a network loop exists upon the determination that the MAC address move count has exceeded an interval MAC address move count threshold.

22. The non-transitory machine-readable storage medium of claim 21, wherein the counting performed by each line card is at a rate equivalent to a receipt of frames rate.

* * * * *